E. JOHNSON.
Feed Trough.

No. 17,839.

Patented July 21, 1857.

UNITED STATES PATENT OFFICE.

ELMORE JOHNSON, OF WINCHESTER, MASSACHUSETTS.

IMPROVEMENT IN HOG-TROUGHS.

Specification forming part of Letters Patent No. 17,839, dated July 21, 1857.

*To all whom it may concern:*

Be it known that I, ELMORE JOHNSON, of Winchester, in the county of Middlesex and State of Massachusetts, have invented a new and useful or Improved Hog-Trough; and I do hereby declare that the same is fully described and represented in the following specification and the accompanying drawings, of which—

Figure 1:
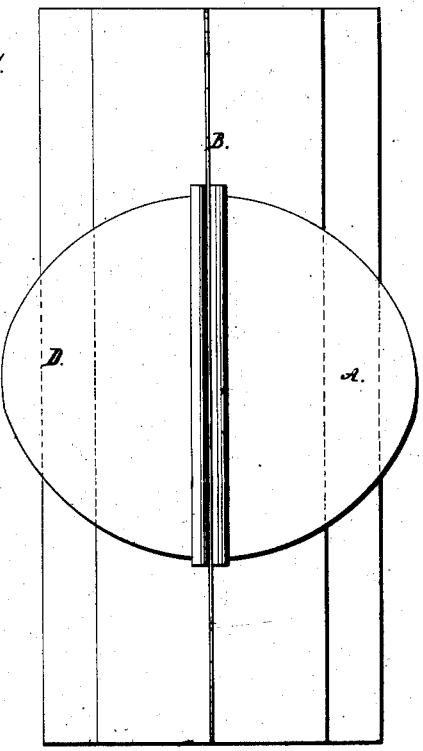
Figure 3:
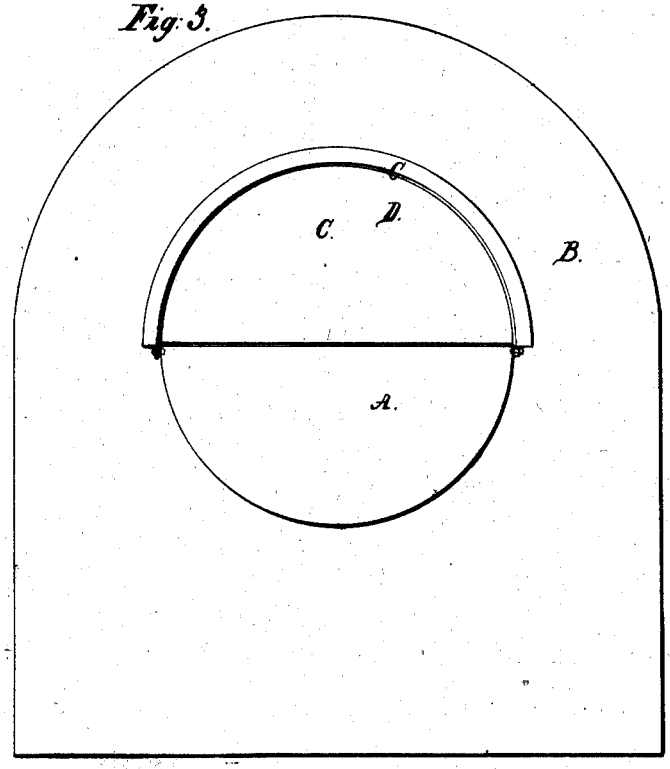
Figure 2:
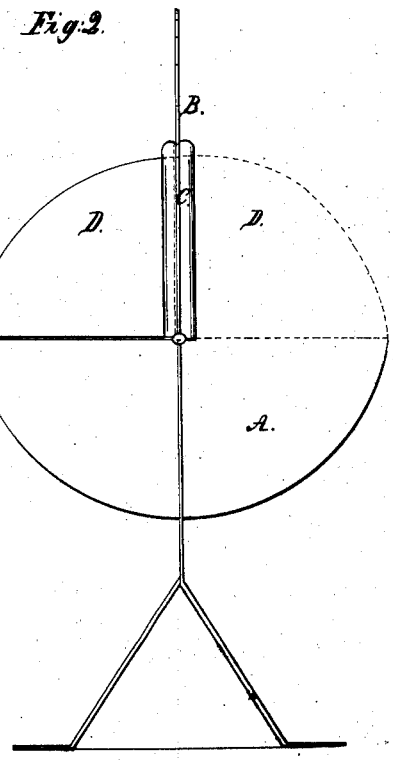

Figure 1 exhibits a top view of my invention; Fig. 2, a side elevation of it; Fig. 3, a front elevation, and Fig. 4 a central, vertical, and longitudinal section, of it.

The purpose of my invention is to enable a trough to be supplied with provender or food without interference from a hog or animal within the sty or pen to which said trough may be applied.

Figure 4:
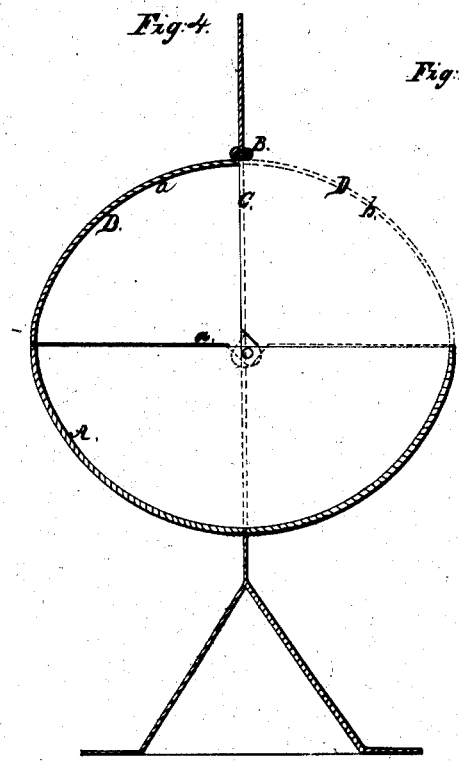

In the drawings, A denotes an elongated bowl or trough placed in an upright wall, partition, or frame B, and so as to extend on opposite sides of the same, as shown in Figs. 2 and 4. Directly above the trough or bowl and extending over the middle of the same the partition or frame B is provided with a semicircular or arched opening C, the same being so formed as to enable a quadrantal cover D to be turned on its hinges and from one half of the box to the other. This quadrantal cover at the angles of junction of its two edges is hinged to the middle of the upper part of the trough, and so as to allow it to be turned from the position seen at $a\,a$ in Fig. 4 into that exhibited by dotted lines at $b$ in such figure. In each position of the cover it extends from the partition down to and around the edge of that half of the bowl directly over which it may rest, and thus while it covers over such half of the bowl and closes the arched opening in the partition it leaves uncovered the other half of the bowl. If we suppose this latter half of the bowl to extend into the hog-sty, the animal, when such is uncovered and the other half covered, can have free access to the bowl or to any provender within the same; but when the cover is turned back over and upon that half of the bowl which extends within the sty not only will the animal in the sty be cut off from all communication with the bowl, but the latter will be open on its front, so as to enable a person to supply said bowl with food.

In constructing my improved hog-trough it is to be made of sheet-iron or other suitable metal, or it may be constructed mostly or entirely of cast-iron. Its value will readily be seen by farmers or those who may keep or have swine.

I claim—

An elongated trough or bowl and a quadrantal cover arranged or applied together and in an opening in a frame, wall, or the side of a pen or sty, and made to operate substantially as specified.

In testimony whereof I have hereunto set my signature this 18th day of May, A. D. 1857.

ELMORE JOHNSON.

Witnesses:
R. H. EDDY,
F. P. HALE, Jr.